United States Patent
Jin et al.

(10) Patent No.: US 9,045,354 B2
(45) Date of Patent: Jun. 2, 2015

(54) METHODS FOR ENHANCED OXIDATIVE AND REDUCTIVE REMEDIATION

(75) Inventors: Song Jin, Fort Collins, CO (US); Paul H. Fallgren, Highlands Ranch, CO (US); Christopher H. Nelson, Castle Rock, CO (US)

(73) Assignee: Advanced Environmental Technologies, LLC, Fort Collins, CO (US)

( * ) Notice: Subject to any disclaimer, the term of this patent is extended or adjusted under 35 U.S.C. 154(b) by 861 days.

(21) Appl. No.: 13/236,412

(22) Filed: Sep. 19, 2011

(65) Prior Publication Data

US 2012/0070696 A1 Mar. 22, 2012

Related U.S. Application Data

(60) Provisional application No. 61/385,156, filed on Sep. 21, 2010.

(51) Int. Cl.
| | |
|---|---|
| C02F 3/00 | (2006.01) |
| C02F 3/30 | (2006.01) |
| H01M 8/16 | (2006.01) |
| C02F 1/461 | (2006.01) |
| C02F 103/06 | (2006.01) |

(52) U.S. Cl.
CPC ............ C02F 3/005 (2013.01); C02F 3/301 (2013.01); C02F 2001/46123 (2013.01); C02F 2001/46138 (2013.01); C02F 2001/46161 (2013.01); C02F 2103/06 (2013.01); C02F 2201/46115 (2013.01); H01M 8/16 (2013.01); Y02E 60/527 (2013.01)

(58) Field of Classification Search
CPC ......... C02F 3/005; H01M 8/16; Y02E 60/527
USPC ...................................... 210/601, 615; 429/2
See application file for complete search history.

(56) References Cited

U.S. PATENT DOCUMENTS

| | | | |
|---|---|---|---|
| 7,858,243 B2 | 12/2010 | Jin | |
| 8,663,852 B2 * | 3/2014 | Nevin et al. ................... 429/401 |
| 2007/0023285 A1 * | 2/2007 | Yang et al. ................. 204/403.01 |
| 2008/0292912 A1 * | 11/2008 | Logan et al. ....................... 429/2 |
| 2009/0159455 A1 | 6/2009 | Logan et al. | |
| 2010/0151279 A1 * | 6/2010 | Logan et al. ....................... 429/2 |
| 2011/0171496 A1 * | 7/2011 | Noguera et al. .................. 429/2 |

FOREIGN PATENT DOCUMENTS

| | | | |
|---|---|---|---|
| EP | 1947716 A1 * | 7/2008 | |
| EP | 2157652 A1 * | 2/2010 | |

OTHER PUBLICATIONS

Liu, H., et al., Electricity Generation Using an Air-Cathode Single Chamber Microbial Fuel Cell in the Presence and Absence of a Proton Exchange Membrane,: Environmental Science & Technology, vol. 38, No. 14, 2004, pp. 4040-4046.*

(Continued)

*Primary Examiner* — Chester Barry
(74) *Attorney, Agent, or Firm* — Santangelo Law Offices, P.C.

(57) ABSTRACT

Enhanced contaminant degradation systems via rapid transfer of electrons in an environment or matrix through bioelectrochemical electron transfer circuitry, electron transfer conduit and conductive materials. Specialized circuitry may be used with respect to the anode, cathode, and transmission line design including floating cathodes, anchored anodes, and the like.

19 Claims, 13 Drawing Sheets

(56) References Cited

OTHER PUBLICATIONS

Pant, D., et al., "A review of the substrates used in microbial fuel cells (MFCs) for sustainable energy production," Bioresource Technology 101 (2010) 1533-1543.*

Feng, Y., et al., "Brewery wastewater treatment using air-cathode microbial fuel cells," Appl. Microbiol. Biotechnol (20080 78:873-880.*

Morris, J.M., et al., "Feasibility of using microbial fuel cell technology for bioremediation of hydrocarbons in groundwater," J Environ Sci Health a Tox Hazard Subst Environ Eng Jan. 2008, 43(1):18-23.*

An, J. et al. Floating-type microbial fuel cell (FT-MFC) for treating organic-contaminated water, 2009, Environ. Sci. Technol. 43:1642-1647.

An, J. et al. Multiphase electrode microbial fuel cell system that simultaneously converts organics coexisting in water and sediment phases into electricity, 2010, Environ. Sci. Technol. 44:7145-7150.

Luo, H. et al. Phenol degradation in microbial fuel cells, 2009, Chem. Eng. J. 147:259-264.

Morris, J. M. et al. Microbial fuel cell enhancing anaerobic biodegradation of diesel, 2009, Chem. Eng. J. 146:161-167.

Scott, K. et al. Fuel cell power generation from marine sediments: Investigation of cathode materials, 2008, J. Chem. Technol. Biotechnol. 83:1244-1254.

Zhang, C. et al. Pyridine degradation in microbial fuel cells, 2009 J. Hazard. Mater. 172:465-471.

U.S. Appl. No. 61/385,156, filed Sep. 21, 2010.

\* cited by examiner

METHODS FOR ENHANCED OXIDATIVE AND REDUCTIVE REMEDIATION

This is a U.S. non-provisional patent application claiming priority to and the benefit of U.S. Provisional Application No. 61/385,156, filed Sep. 21, 2010, hereby incorporated by reference herein.

BACKGROUND OF INVENTION

Bioelectrochemical (BEC) systems (e.g., microbial fuel cells, biofuel cells, electrolysis) may have been used in the past for power generation. In the form of microbial fuel cells (MFCs), these systems may have enhanced biodegradation of hydrocarbons, phenol, and other contaminants perhaps while also generating energy. Bioelectrochemical systems may have also been tested in groundwater and sediments for organic carbon removal while generating electricity. A bioelectrochemical system may include an anode, a cathode, and a circuit (perhaps with or without external resistor). For example, in a 2-chambered MFC, microorganisms in the anoxic/anaerobic zone can transfer electrons to the anode, which are then transferred to the cathode. Oxygen may be reduced to water at the cathode, which may produce a current. These types of BECs may separate the anode and cathode by a cation, proton exchange membrane, a salt bridge, or the like to allow protons to transfer between the anode and cathode while minimizing contact of oxygen with the anode. It has been recognized that a floating type cathode combined with an anode system exposing a cathode to air can be used and the water column can complete the circuit.

None of the past BEC systems have provided a sustainable and "green" method with perhaps little to no load, in the presence or even absence of microorganisms, which may focus solely on enhancing degradation of waste compounds, perhaps organic waste compounds from environments such as water/wastewater, groundwater, and soils/sediments.

SUMMARY OF INVENTION

The present invention includes a variety of aspects, which may be selected in different combinations based upon the particular application or needs to be addressed. In the embodiments, the invention may include systems using electron transfer mechanisms to increase oxidative degradation of contaminants in an environment.

An object of the invention may be to provide a BEC or other type of electron transfer system which can increase degradation of contaminants perhaps through biocatalyst systems, oxidative, or even reductive systems.

Another object of the present invention may include, in embodiments, methods and apparatus for efficient use of specialized cathodes in BEC systems.

Yet another object of the invention may be to provide a three-dimensional floating-type cathodes or even multiple-level cathodes for use in BEC systems such as but not limited to microbial fuel cells, microbial electrolysis cells, and the like.

Another object of the present invention may include, in embodiments, the use Styrofoam (expanded plastic made from polystyrene) or the like, cork, air filled containers, or even other buoyant materials perhaps with water-absorbing materials (e.g., sponge, etc.) for maintaining optimal contact of air and water at the cathode under varying water levels conditions.

Yet another object of the present invention may include, in embodiments, the use of specialized cathodes in BEC systems enhancing biodegradation of organic compounds in soils, groundwater, surface water, wastewater, and the like, and enhancing transformation of inorganic chemicals in soils, groundwater, surface water, wastewater, and the like.

Naturally, further objects, goals, and embodiments of the inventions are disclosed throughout other areas of the specification and figures.

DETAILED DESCRIPTION OF THE PREFERRED EMBODIMENTS

Figure 1:
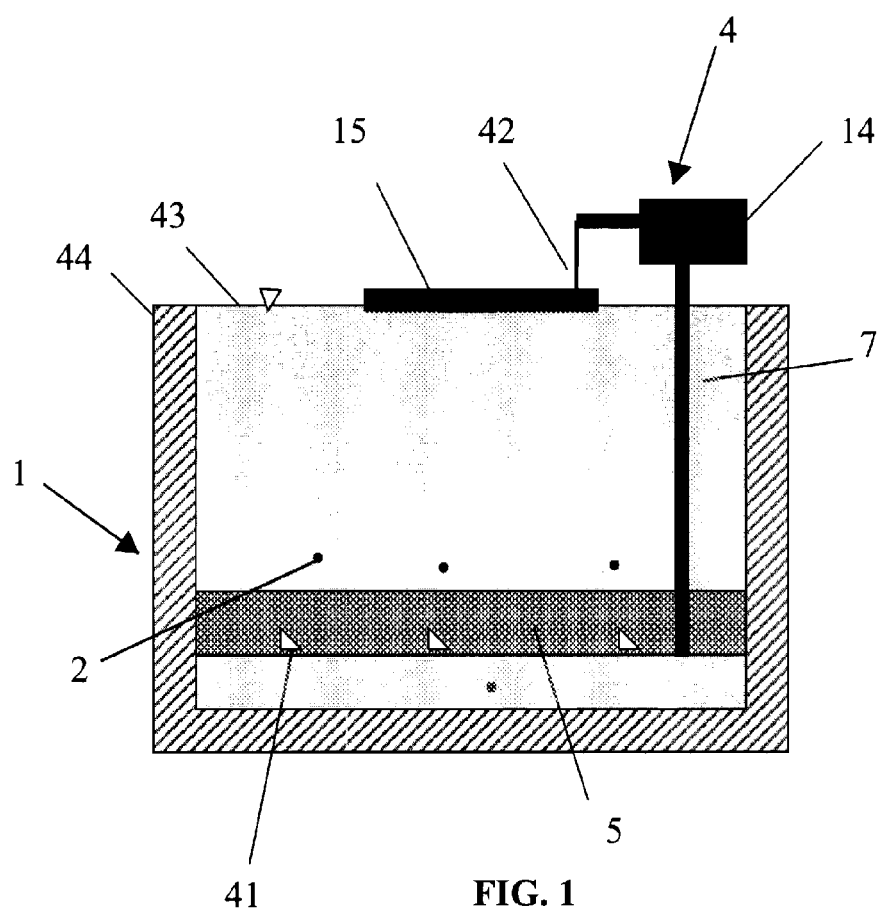
FIG. 1 shows an example of an embodiment of a BEC system field application in treating a wastewater environment as may be understood in the various embodiments of the present invention.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

The present invention may identify that the electron transfer mechanisms of a bioelectrochemical ("BEC") system or even any type of electron transfer system can increase the degradation rate of organic compounds in environments such as in groundwater and even in a saturated zone. This may be accomplished via two mechanisms. First, the presence of a highly conductive electrode and efficient contact of cathode with ambient air can sustain a rapid electron transfer which may expedite a biocatalyzed oxidation (e.g., electron extraction) of organic compounds in a contaminated environment such as but not limited to soil, groundwater, wastewater matrix, and the like. The contact of a cathode with ambient air may eliminate the necessity of aeration while sustaining an aerobic pathway. Alternatively, not all electrons transferred by the electrode may be utilizable by microbes to harvest energy. This process therefore may present a competitive electron sink which may stimulate the microbes to achieve a higher biodegradative rate of organic compounds to obtain sufficient electrons for survival. These two mechanisms of a BEC system, individually or even in combination, can significantly enhance the degradation of organic contaminants in environments such as but not limited to groundwater, the capillary fringe, surface water, and wastewater.

Embodiments of the present invention may include methods of enhancing remediation of contaminated matrices comprising the steps of providing an environment having at least one contaminant and at least one microbial population; providing a bioelectrochemical electron transfer circuitry having at least one anode, at least one cathode and at least one transmission line connecting said at least one anode and said at least one cathode; installing said bioelectrochemical electron transfer circuitry in said environment having said at least one contaminant; generating rapid transfer of electrons from said environment to said at least one anode of said bioelectrochemical electron transfer circuitry and said at least one cathode of said bioelectrochemical electron transfer circuitry through said at least one transmission line of said bioelectrochemical electron transfer circuitry; stimulating said at least one microbial population with said rapid transfer of electrons from said environment to said at least one anode of said bioelectrochemical electron transfer circuitry and said at least one cathode of said bioelectrochemical electron transfer circuitry through said at least one transmission line of said bioelectrochemical electron transfer circuitry to provide at least one stimulated microbial population; and perhaps even substantially ameliorating microbial biodegradation of said at least one contaminant in said environment with said at least one stimulated microbial population.

Contaminant remediation enhancement systems may comprise an environment having at least one contaminant and at least one microbial population; a bioelectrochemical electron transfer circuitry installed in said environment, wherein said bioelectrochemical electron transfer circuitry comprises at least one anode connected to at least one cathode through at least one transmission line; a rapid electron transfer movement from said environment to said at least one anode and said at least one cathode through said at least one transmission line of said bioelectrochemical electron transfer circuitry in said environment; at least one stimulated microbial population responsive to said rapid electron transfer movement from said environment to said at least one anode and said at least one cathode through said at least one transmission line of said bioelectrochemical electron transfer circuitry in said environment; and perhaps even a substantially ameliorated microbial biodegradation of said at least one contaminant in said environment.

Incorporation of remediation systems for in-situ or even ex-situ remediation of contaminants or treatment of wastewater is desirable. Embodiments of the invention may focus on the application of BEC systems in the field practice of enhancing biodegradation of environmental contaminants of concern in groundwater, surface water, and wastewater. For in situ remediation, BEC systems can be installed using specially designed groundwater treatment wells. Alternatively, existing monitoring wells can be used if they already exist at a site. Bioelectrochemical electron transfer circuitry may be used in conjunction with an aeration system and may even be installed in an aeration basin. For waste water treatment, existing aeration basins can be used for the installation of a BEC system. Contaminants (2) may include but are not limited to organic contaminants, municipal contaminants as reflected by chemical oxygen demand, municipal contaminants as reflected by biological oxygen demand, hydrocarbons, phenols, petroleum related compounds, petroleum hydrocarbons, gasoline range organics, diesel range organics, halogenated compounds, endocrine disrupting compounds, any combination thereof, and the like. Different types of microbial populations may be utilized in the system and may include but are not limited to indigenous microbial population, aerobic microorganisms, facultative microorganisms, obligate anaerobic microorganisms, any combination thereof, and the like.

The present invention may include a basic design of BEC system installed in an environment such as an existing aeration basin, ditch, and the like. In embodiments, the present invention may provide a system with bioelectrochemical electron transfer circuitry (4) installed in an environment (1) as shown in FIG. 1. An environment may be a water environment, groundwater, sediments, unsaturated zone, vadose zone, saturated zone, saturated soil, wastewater, wastewater matrix, capillary fringe, surface water, capillary fringe, in-situ environments, ex-situ environments, any combination thereof, and the like environments. When installing a bioelectrochemical electron transfer circuitry in an environment, a system may be integrated therein so that perhaps some of the components may be in the environment and some may be near or even outside the environment. For example, FIG. 1 shows that at least one anode (5) may be anchored by an anode anchor (41) within a water environment. In this example, a system is located within an aeration basin wall (44). A transmission line (7) which may be an insulated wire connection may be connected to a resistor (14) which may then be connected to a cathode, in this instance a floating cathode (15) with a wire connection (42). A wire connection (42) may have some slack in it perhaps to adjust to a change in water level. A floating cathode (15), as discussed in more detail below, may be located near a water surface (43) of an environment. By being placed near a water surface, a cathode may be located at, close, in close proximity, within or even on a water surface.

Figure 5:
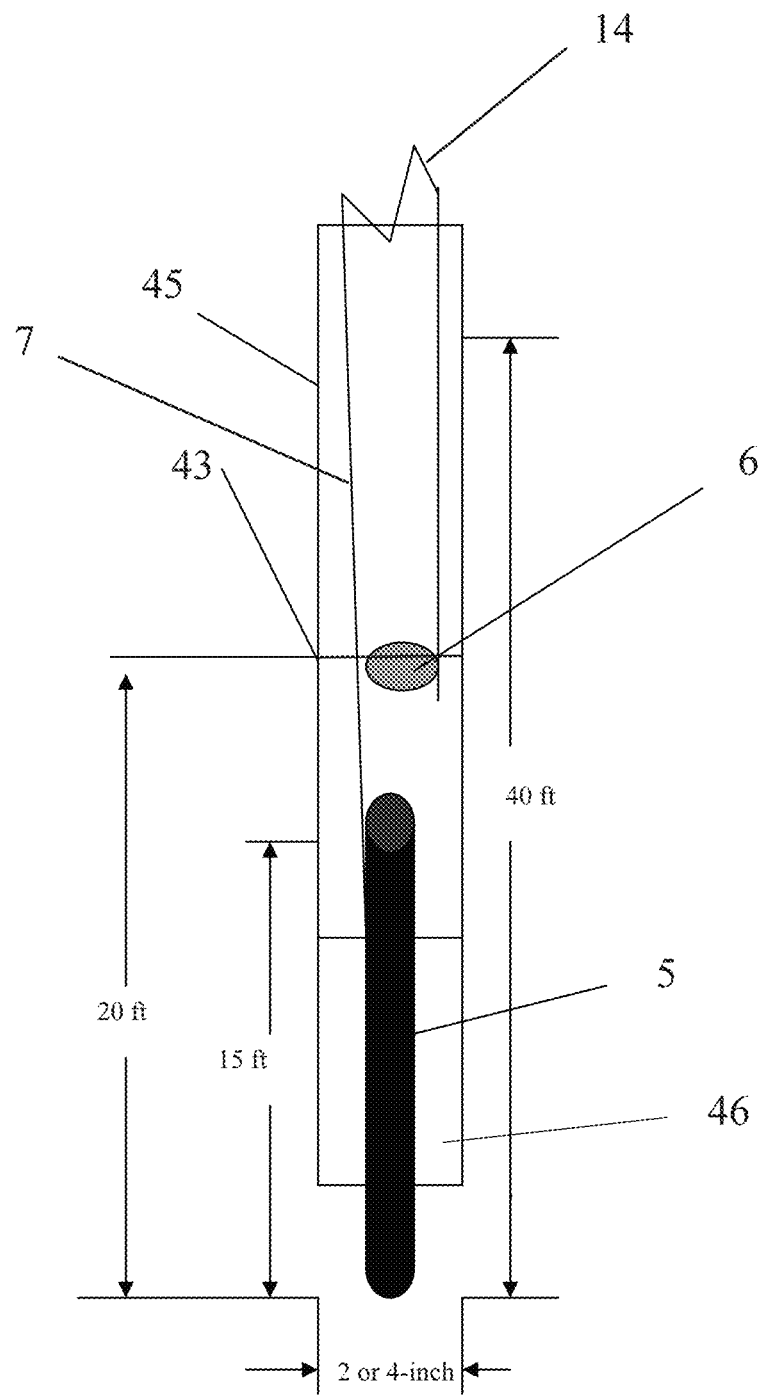
FIG. 5 shows an example of an embodiment of a BEC field application for remediating groundwater as may be understood in the various embodiments of the present invention.

In other embodiments, the present invention may provide a system installed in a well perhaps a groundwater treatment well, monitoring well, more than one well, or the like. FIG. 5 shows an example of bioelectrochemical system installed in a well. A cathode (6) may be located near a water surface (43) of a groundwater level. The cathode (6) may be connected to an anode (5) through a transmission line (7). A transmission may include but is not limited to wire, copper wire, stainless steel wire, titanium wire, conductive materials, insulating sleeve, and any combination thereof, and the like. A resistor (14), perhaps even a 1000-ohm resistor as a non-limiting example, may be used in the system. The well may have a well casing (45) that may be between about 2 to about 4 inches in diameter. The anode (5), for example, may be carbon mesh rolled in perhaps three layers and may even have a non-conductive weight at the bottom. A well screen (46) may be located near the bottom of the anode and the well and the well screen may be about 25 feet.

The dimensions of a BEC system, a bioelectrochemical electron transfer circuitry, and designs may be modified to fit specific configurations and which may be selected in different combinations based upon the particular application or needs to be addressed. A bioelectrochemical electron transfer circuitry (4) may include but is not limited to systems based on microbial fuel cells, biofuel cells, microbial electrolysis cells, electrolysis cells, and the like. A BEC system may include at least one anode (or even multiple anodes), at least one cathode (or even multiple cathodes), transmission lines wires, and the like. These components may be connected to provide a closed circuit (10) so that electrons may follow a continuous and perhaps even uninterrupted path. In addition, some embodiments may also include a resistor, anode anchors, and the like. An anode may be installed by immersing it in a groundwater well or even in an existing aeration basin perhaps while maintaining maximal surface area. Under certain cases, such as for an operating aeration basin, proper anchors may be needed to prevent the anode from floating up or even interfering with the aerator emitters below. Anchors may include but are not limited to sand bags, insulated hooks, insulated metal weights, ceramic weights, weights, hooks, insulated plastic hook, plastic ties, ties, any combination thereof, and the like.

Figure 6:
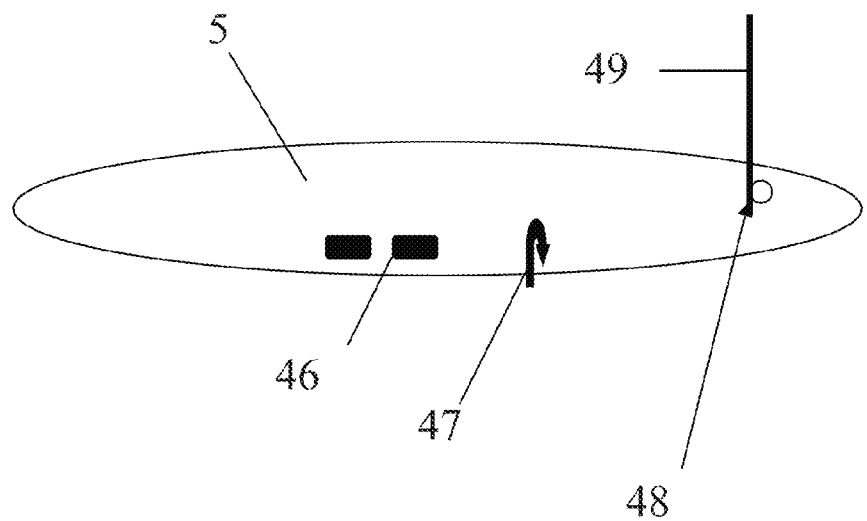
FIG. 6 shows an example of an anode of a BEC system used in remediation of organic compounds as may be understood in the various embodiments of the present invention.
Figure 7:
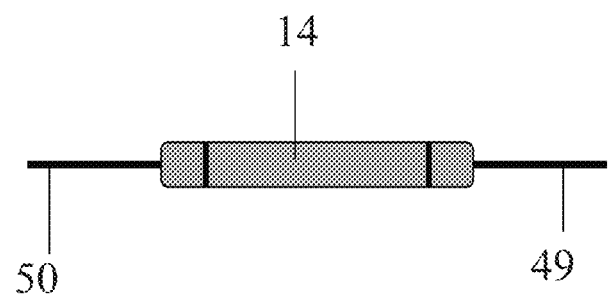
FIG. 7 shows an example of a resistor and insulated wire of a BEC system used in remediation of organic compounds as may be understood in the various embodiments of the present invention.
Figure 8:
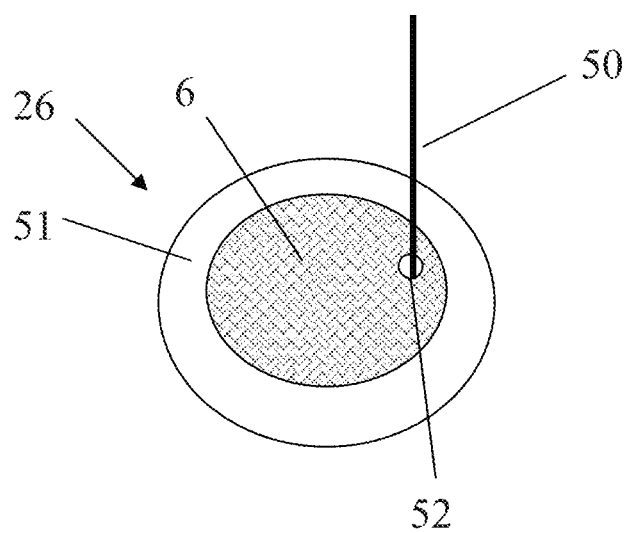
FIG. 8 shows an example of a floating cathode of a BEC system used in remediation of organic compounds as may be understood in the various embodiments of the present invention.

For example, an anode (5) may be made of a carbon mesh or net with granulated carbon and may be anchored with an anode anchor (41) which may be an insulated metal weight (46) or even a hook (47) as shown in FIG. 6. A wire-anode connection (48) may connect the anode to a transmission line (7) and may be made of a stainless steel nut and bolt which may be covered in silicon, epoxy or the like. A transmission line (49) from the anode may be connected to a resistor (14) and a transmission line (50) may then be connected to a cathode as understood from FIG. 7. An example of a cathode embodiment is shown in FIG. 8 where a cathode (6) may be configured to float near a surface of a water environment and may even have a floating material (51) attached thereto. A transmission line (50) may connect a load to the cathode with a wire-cathode connection (52) which may be a direct connection covered by silicon or epoxy or the like.

In embodiments of the present invention, a cathode surface area may be designed to maximize contact of air (atmospheric oxygen) and water (protons) to promote maximum electron flow even under variable water level conditions. In an aeration basin or even groundwater wells, space may be limited for efficient contact between the cathode and ambient air. This can limit the biodegradation enhancement efficiency. Also, water levels may vary in the aeration basin and in wells; therefore, the cathode may need to adjust to the changing water levels while still in contact with ambient air and oxygen. To enhance degradation, the anode may remain saturated and may extend through the zone of contamination while not touching the cathode.

An anode may be placed within an environment and may even be a non-floating anode, a sediment submerged anode, a submerged anode, an anchored anode, and the like. Anodes for use with BEC systems may be fabricated from materials including but not limited to carbon cloth, stainless steel wool, stainless steel mesh, bagged graphite granules, carbon mesh, thermal pretreated materials, a net with granulated carbon, conductive materials, any combination thereof, and the like. The wire connecting to the anode may be of stainless steel, titanium, or copper. Wire may be connected to the anode at multiple points through physical joints (e.g., knots or welding) that may be sealed by epoxy and silicon to avoid water intrusion. Segments inside the water or at close proximity to water may need to be insulated. Going through a resistor, the wire may be connected to the cathode in a similar pattern as with the anode.

An anode may be separated from a cathode by perhaps a separator which includes but is not limited to film, insulator film, paint, chamber, water, membrane, permeable membrane, cations, proton exchange membrane, salt bridge, any combination thereof, and the like. The separation may be any distance perhaps ranging from a close or even near placement where perhaps a thin separator may be used to a large separation where perhaps a salt bridge may be used. Cathodes for use with BEC systems may be fabricated from material including but not limited to stainless steel mesh, stainless steel plates, carbon cloth, carbon mesh, semiconducting minerals, photoconductive materials, and any combination thereof, and the like.

Figure 9:
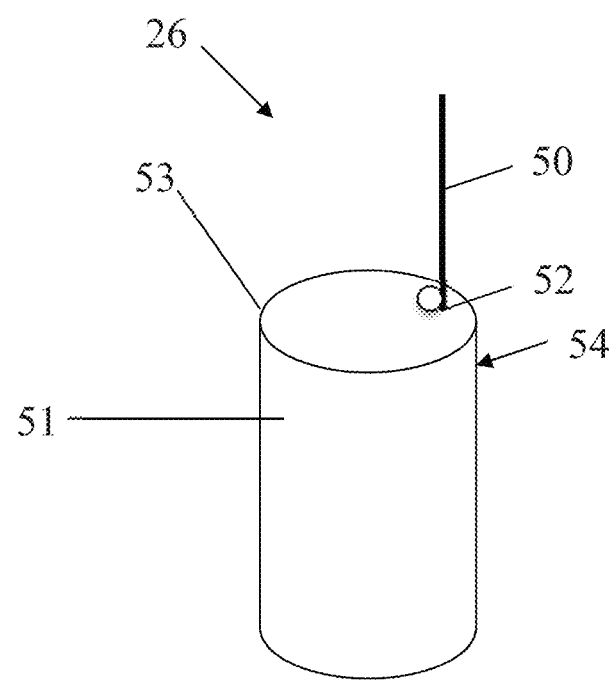
FIG. 9 shows an alternative example of a floating cathode design of the BEC system used in remediation of organic compounds as may be understood in the various embodiments of the present invention.

In embodiments, the present invention may provide a system or even a bioelectrochemical electron transfer circuitry which can be adapted to work with variable water level conditions perhaps as a variable water level adjustment cathode (26). For example, the cathodes may be fabricated to be a floating-type cathode that can float on the water surface of a BEC system. The floating material may include but is not limited to buoyant material, cork, expanded plastic, Styrofoam (expanded plastic made from polystyrene), air filled containers, any combination thereof, and the like. The floating cathode may be fabricated with cathode material exposed to oxygen and in contact with water and the floating material (51) may be connected to the cathode (6) as shown in FIG. 8. Additionally, floating cathodes may be fabricated into three-dimensional floating cathode forms that may include shapes such as cylinders, cubes, spheres, and the like. An example of a cylinder shaped three-dimensional floating cathode (53) may be understood in FIG. 9. A floating material (51) may be contained inside a three-dimensional cathode body (54). Furthermore, a water absorbing material, such as but not limited to a sponge, may be placed inside the three-dimensional floating cathode to provide moisture to any part of cathode exposed above the water surface perhaps as a way to balance buoyancy with water absorption in a cathode design and even as a way to maximize air and water contact.

Figure 10:
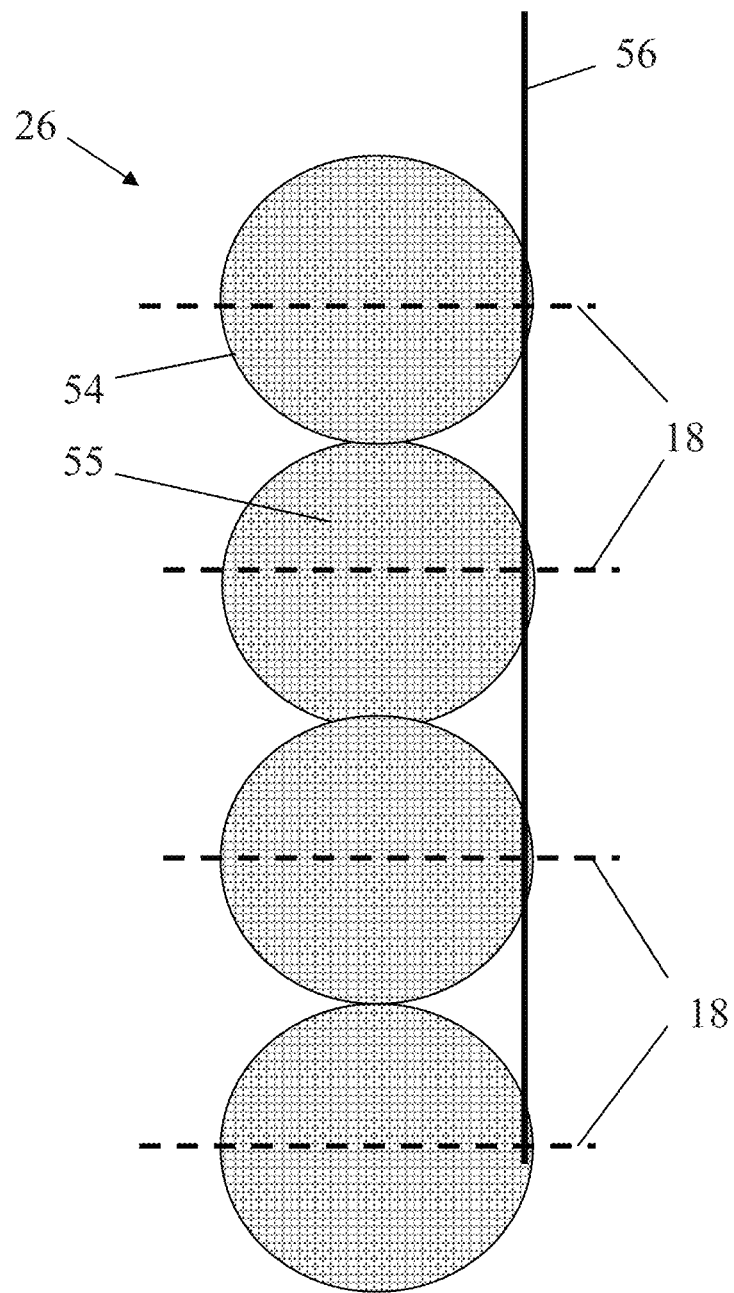
FIG. 10 shows an example of a multiple cathode design of a BEC system used in remediation of organic compounds as may be understood in the various embodiments of the present invention.

Alternatively, multiple cathodes may be fabricated and wired separately to a cathode at different water heights (18) in a single BEC system to account for wide-ranging changes in water level. As shown in FIG. 10, the multiple cathodes connected via an insulated wire (56) may be fabricated into three-dimensional forms having a cathode body (54) with water absorbing material (55) such as a sponge inside to provide moisture to any part of the cathodes that are exposed above the water surface. This system could be self regulating and operational for various water depths since only the cathode with air/water contact could be functional.

Resistors of the range from about 10 to about 10,000 ohm may be used for the BEC. A low-ohm resistor such as about 10 ohm may be used at the beginning of the BEC installation. This may encourage rapid current movement in the circuit. A larger resistor may be favorable to form biofilm on the anode which may or may not be desirable. The resistance can be increased or decreased depending on the specific needs during the project.

For groundwater remediation or any other system, the anode and cathode may be placed in separate wells. This may help to achieve a larger radius of influence than using a single well by promoting electron flow between the wells. Embodiments may include encasing an anode in part of a well.

For groundwater remediation and the like, air and atmospheric oxygen transfer can be enhanced by using a stick-up well box with side perforations and a plastic tube inserted into the well casing from one of the perforations (not shown but as may be understood from FIG. 1). Alternatively, if flush mount well boxes are required at the site, a low flow soil vapor extraction system (possibly solar powered) can be connected to the well and operated under positive or negative conditions to supply air (oxygen).

Embodiments of the present invention may include increasing conductivity in an environment perhaps as a mechanism to increase the efficiency of the system. A conductive material may be added as a conductivity enhancer (not shown but as may be understood in FIG. 13) and may include but is not limited to conductive materials, sodium chloride, sodium chloride, potassium chloride, magnesium chloride, sodium carbonate, sodium bicarbonate, calcium carbonate, calcium bicarbonate, other salts, any combination thereof, and the like. For groundwater remediation, conductive materials, including but not limited to sodium chloride, may be added to the surrounding groundwater to enhance the conductivity and radius of influence of the BEC remediation well. Any additions would be temporary and in compliance with appropriate groundwater quality standards.

The various remediation systems discussed herein may act as an electron sink for the surrounding environment including groundwater in groundwater remediation applications. The radius of influence can be further enhanced by understanding and manipulating the geochemistry of the site where, for example, reduced, soluble electron acceptors are oxidized as they pass near the a MFC remediation well, as one example, (due to groundwater flow) and are then available for bioremediation down-gradient.

Figure 11:
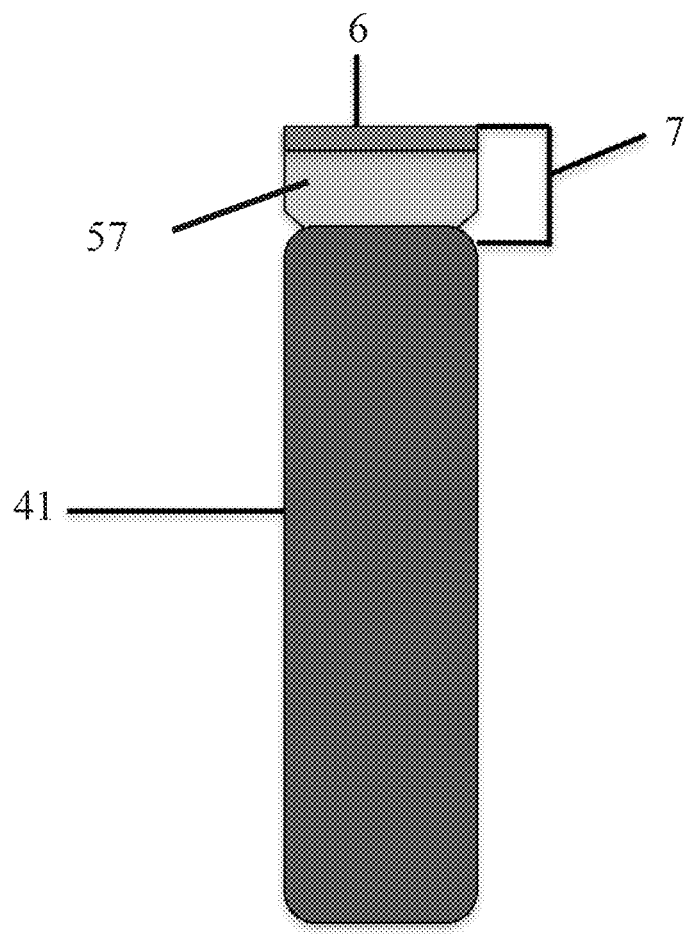
FIG. 11 shows an outer view of an example of a tubing electrode embodiment of a BEC system as may be understood in the various embodiments of the present invention.
Figure 12:
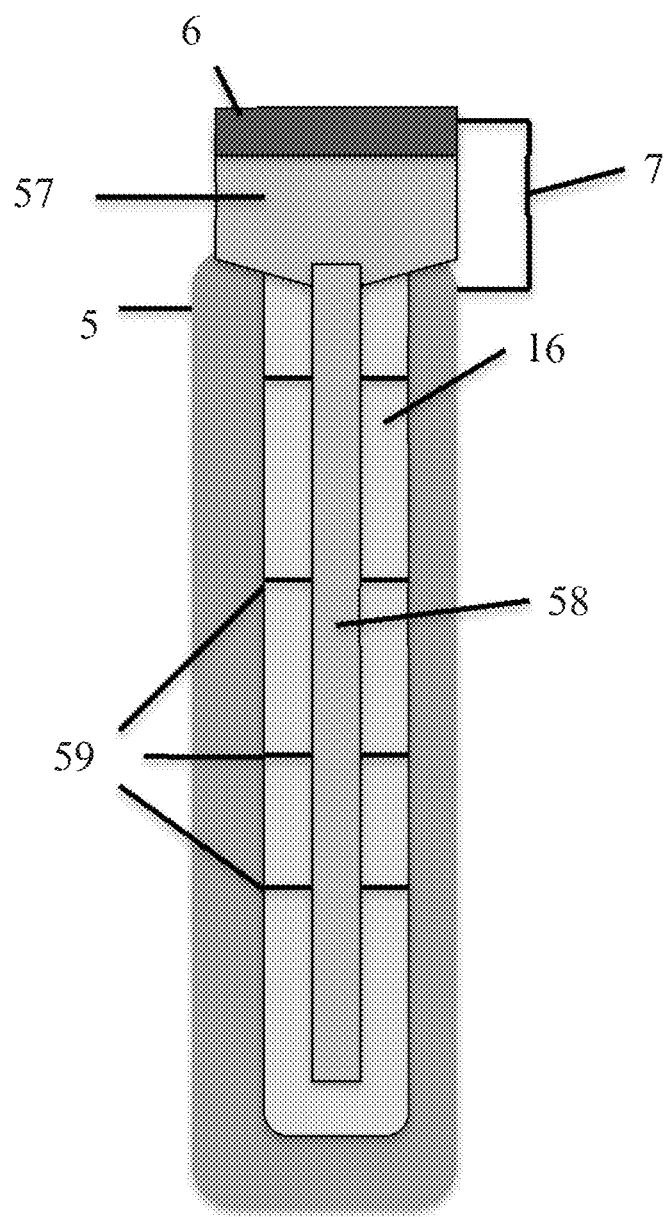
FIG. 12 shows an internal view of an example of a tubing electrode embodiment of a BEC system as may be understood in the various embodiments of the present invention.

In embodiments, the present invention may provide a system which may operate without any load and may run as a passive system. Therefore, generation of rapid transfer and even movement of electrons in a system may run as a passive system which does not require any external resistor and load and can operate on its own. FIG. 11 shows an example of an outside view of a tubing electrode system containing a cathode (6) perhaps with a chamber (57) which may support the cathode and may contain a proton transfer medium such as but not limited to water, gel, or other medium, or the like. An anode (41) may be near the cathode and may be connected with a transmission line (7). FIG. 12 shows an inside view of a tubing electrode system where a cathode (6) perhaps with a chamber (57) may be connected to an 25 anode (5) with a transmission line (7). A separator (16) may be included near the anode of which the separator may be a porous, water absorbing material. A system may even have a conductive perforated tube (58) which may be gel or any other medium located inside the tubing electrode system for proton transfer. Connections (59) to the anode may be located between the conductive perforated tube and the anode. There may not be any resistors or load used. However, as mentioned herein, load and resistor may be included as an alternative embodiment. In embodiments, the present invention may provide a jump start to the system to start or even enhance the electron movement perhaps by adding a resistor or a limited load which could be between about 10 to about 10,000 ohms and any and all increments therein. A limited applied load may be added to the system to generate the electron movement and may then be removed from the system to allow it to run passively.

Figure 13:
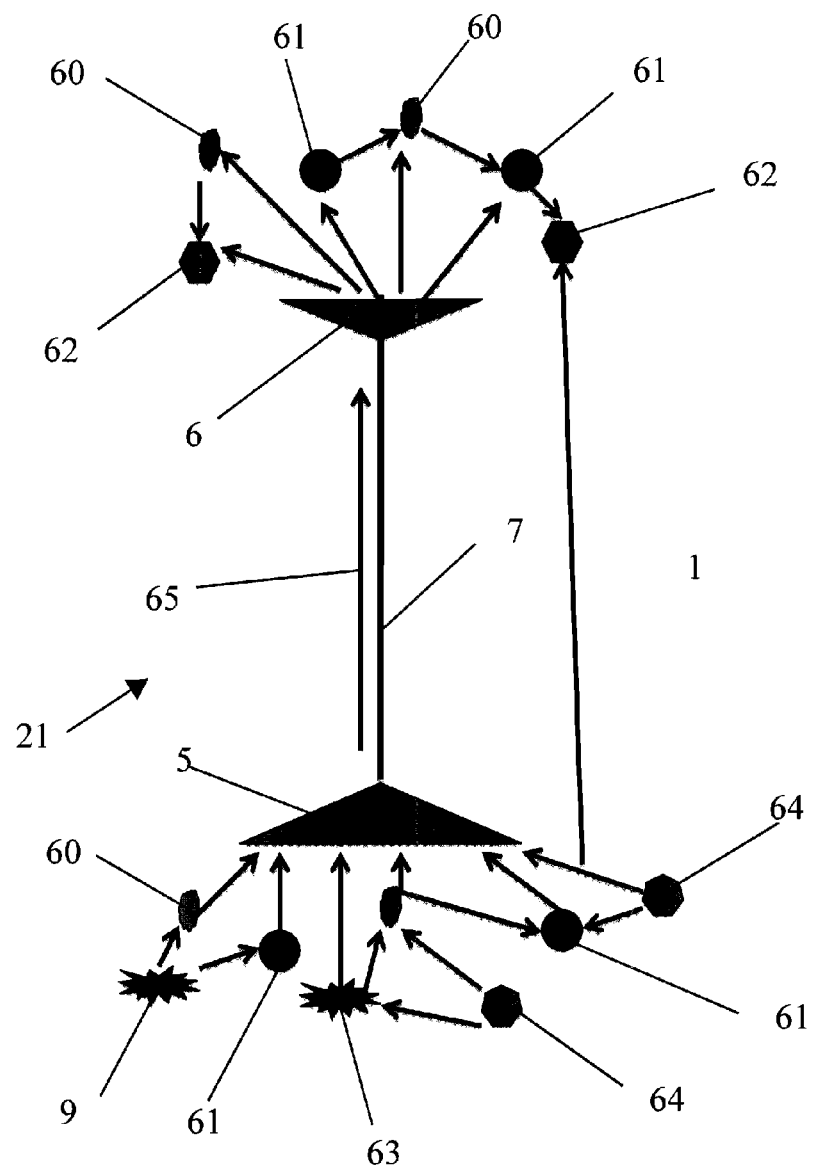
FIG. 13 is a conceptual schematic of a contaminant bioremediation enhancement system as may be understood in the various embodiments of the present invention.

FIG. 13 shows the direction of electron movement (65) and flow for various systems in enhancing remediation of contaminated matrices from an environment (1) to an anode (5) through a transmission line (7) to a cathode (6). A system may utilize microorganisms (60) of at least one microbial population; solid particles (61) which may be soil, sediments, minerals, metals, or the like; terminal electron acceptors (62) which may be $O_2$, $NO_3^-$, $SO_4^{2-}$, contaminants that can accept electrons, and the like; organic compounds (63) which may include organic contaminants and humic acids; and perhaps even dissolved inorganic electron donors (64) such as $Fe^{2+}$, reductants, and the like. Rapid electron transfer movement (21) may be a cycle where electron movement may be transferred from organic compounds (63), microorganisms (60), dissolved inorganic electron donors (64), solid particles (61) near the anode (5) through the transmission line (7) to the cathode (6). Electrons may flow from the cathode (6) to microorganisms (60) and to solid particles (61) and even to terminal electron acceptors (62) near the cathode. The electron transfer movement (21) may stimulate microbes perhaps creating a stimulated microbial population (9) which may act as a biocatalyst for oxidative degradation such that it may catalyze oxidative degradation of contaminants within the matrix or even the environment. In embodiments, degradation of contaminants may occur near the anode, near the cathode, or perhaps even near both the anode and cathode.

Figure 14:
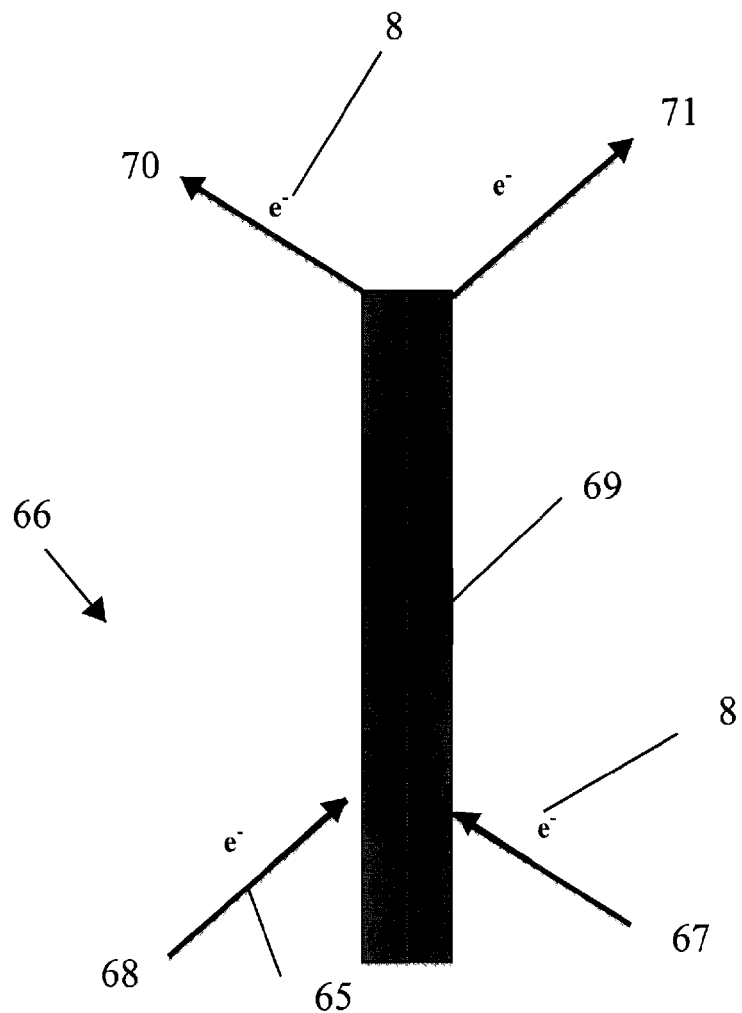
FIG. 14 is a conceptual schematic of contaminant degradation by enhancing electron transfer within a matrix as may be understood in the various embodiments of the present invention.

FIG. 14 shows a general system where any kind of electron transfer generation in a contaminant system may be used to enhance contaminant remediation. Electrons (8) within a matrix (66) may be generated from electron donors (67) such as minerals, metals, dissolved inorganic compounds and the like and may even be generated from oxidation (68) of organic contaminants such as from hydrocarbons or other contaminants that can be oxidized. The electrons (8) may be transferred through a conductive conduit (69) which may have electron conductive material to an area of electron acceptors which may include reduction of terminal electron acceptors (70) such as $O_2$, $NO_3^-$, $SO_4^{2-}$, $Fe^{3+}$, $Cr^{6+}$, TCE, contaminants capable of being reduced, and the like; or other electron acceptors (71) such as mineral particles and the like. The system utilizing electron donors, electron acceptors, and the electron movement thereof may provide enhanced contaminant degradation of a matrix.

Embodiments of the present invention may include a method of enhancing remediation of contaminated matrices comprising the steps of: providing an environment having at least one contaminant; creating a rapid transfer of electrons within said environment; and perhaps even increasing oxidation of said contaminants in said environment.

A laboratory bench-scale study was conducted to test a BEC system for enhancing the biodegradation of petroleum hydrocarbons in groundwater and saturated soil. Two, 2-inch diameter columns (2-ft height) were amended with soil and groundwater contaminated by gasoline range organics (GRO) and diesel range organics (DRO). An anode was constructed from carbon mesh that was thermally pretreated. The anode was connected to insulated copper wire with silicon covering the connection. The cathode was constructed from stainless steel mesh and connected to insulated copper wire with silicon covering the connection. In one column, the anode was submerged into the sediment and the cathode floated on the surface of the groundwater using Styrofoam. Another column was set-up identically without a BEC system to act a control. The anode and cathode were connected to a 1-kohm resistor. Initial samples from both columns were collected and analyzed for GRO and DRO, which were monitored during the study. The initial electrical potential was measured for the column with the connected electrodes and was monitored during the study.

Figure 2:
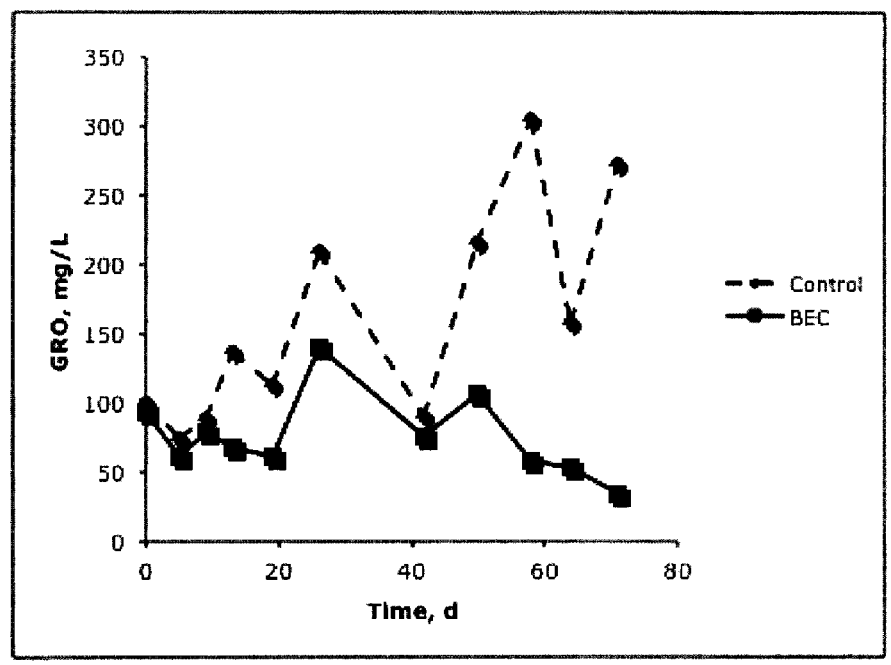
FIG. 2 shows results from a study for gasoline range organics degradation.
Figure 3:
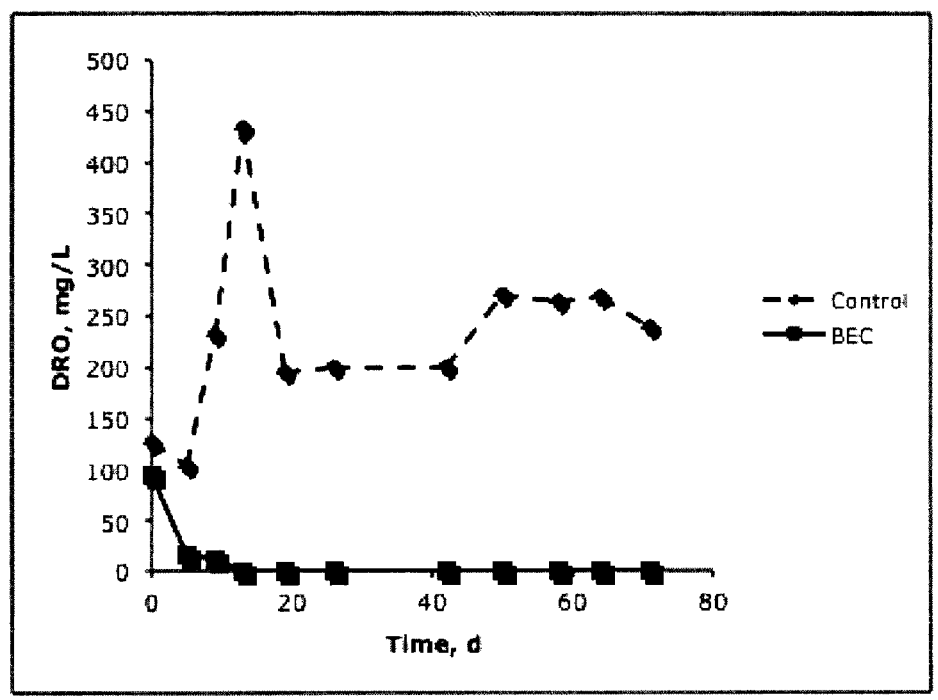
FIG. 3 shows results from a study for diesel range organics degradation.

As shown in FIGS. 2 and 3, the results show that in the BEC system over 50% of the GRO degraded after 70 days, while DRO was degraded to non-detectable levels within 20 days. The voltage for the BEC system ranged from 0.1 to 3.4 mV during the study, indicating microbial activity and contaminant degradation.

Figure 4:
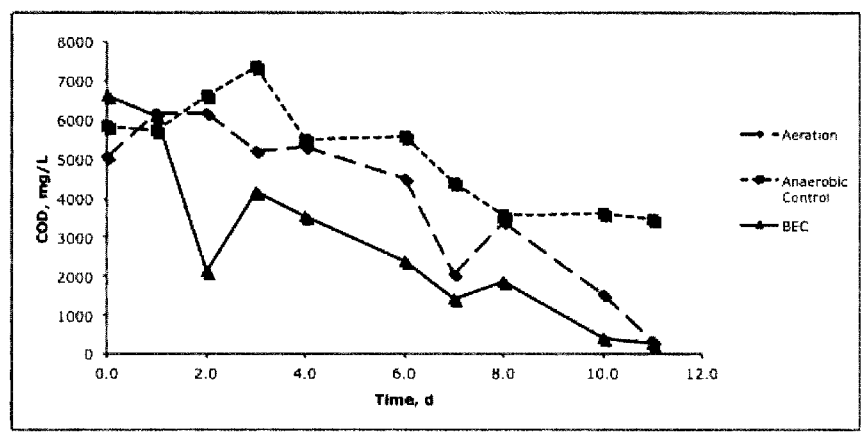
FIG. 4 shows results from a BEC study with Chemical Oxygen Demand (COD) removal.

FIG. 4 shows results from a BEC system tracking the chemical oxygen demand. Aeration may be a normal treatment and an anaerobic control may be a BEC system with circuit disconnected as a control perhaps with no aeration. Chemical oxygen demand (COD) may be a general indicator for organic matter. Within 11 days, BEC degraded COD from about 6500 mg/L to <100 mg/L; the aeration system performed about the same. Anaerobic control degraded COD from 6000 mg/L, to about 4000 mg/L, Thus, BEC systems can eliminate aeration while maintaining at least the same COD removal efficiency, Using these systems with an existing wastewater plant, aeration can be substituted with BEC perhaps saving all the energy used for aeration and may even generate substantial electricity.

In embodiments, the rate of degradation of contaminants may be increased by between about 10% to about 10,000% and any and all increments therein when compared to a baseline degradation without implementing the enhancement systems. Alternatively, perhaps in aeration treatment cells of a wastewater treatment plan, aeration may be decreased between about 5% to about 100% without decreasing a degradation rate of the contaminant. Therefore, embodiments of the present invention may provide energy saving features such as reducing energy input for aeration without losing any degradation rate.

As can be easily understood from the foregoing, the basic concepts of the present invention may be embodied in a variety of ways. It involves both contamination remediation techniques as well as devices to accomplish the appropriate remediation of contaminants. In this application, the contamination remediation techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "degradation" should be understood to encompass disclosure of the act of "degrading"—whether explicitly discussed or not—and, conversely, were there an effective disclosure of the act of "degrading", such a disclosure should be understood to encompass disclosure of a "degradation" and even a "means for degrading." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in this application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the fuel cell devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or viceversa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method of enhancing remediation of contaminated matrices comprising the steps of:
   providing a water environment having at least one contaminant and at least one microbial population;
   providing a bioelectrochemical electron transfer circuitry having at least one non-floating anode, at least one three dimensional, floating cathode and at least one transmission line connecting said at least one non-floating anode and said at least one three dimensional, floating cathode;
   wherein said at least one non-floating anode is separate from said at least one three dimensional, floating cathode; and wherein said three dimensional, floating cathode is adapted to work with variable water level conditions in said water environment;
   installing said bioelectrochemical electron transfer circuitry in said water environment having said at least one contaminant;
   floating said at least one three dimensional, floating cathode near a surface of a water environment;
   contacting most of said three dimensional, floating cathode with either air or water of said water environment;
   wherein part of said three dimensional, floating cathode is in contact with said air and part of said three dimensional, floating cathode is in contact with said water;
   generating rapid transfer of electrons from said environment to said at least one non-floating anode of said bioelectrochemical electron transfer circuitry and to said at least one three dimensional, floating cathode of said bioelectrochemical electron transfer circuitry through said at least one transmission line of said bioelectrochemical electron transfer circuitry;
   utilizing no load or a limited load with said bioelectrochemical electron transfer circuitry;
   wherein said limited load comprises up to about 10 ohms;
   stimulating said at least one microbial population with said rapid transfer of electrons from said water environment to said at least one non-floating anode of said bioelectrochemical electron transfer circuitry and to said at least one three dimensional, floating cathode of said bioelectrochemical electron transfer circuitry through said at least one transmission line of said bioelectrochemical electron transfer circuitry to provide at least one stimulated microbial population; and
   substantially ameliorating microbial biodegradation of said at least one contaminant in said water environment with said at least one stimulated microbial population.

2. A method of enhancing remediation of contaminated matrices according to claim 1 wherein said water environment is selected from a group consisting of groundwater, sediments, unsaturated zone, vadose zone, saturated zone, saturated soil, wastewater, wastewater matrix, capillary fringe, surface water, capillary fringe, and any combination thereof.

3. A method of enhancing remediation of contaminated matrices according to claim 1 wherein said at least one contaminant is selected from a group consisting of organic contaminants, municipal contaminants as reflected by chemical oxygen demand, municipal contaminants as reflected by biological oxygen demand, hydrocarbons, phenols, petroleum related compounds, petroleum hydrocarbons, gasoline range organics, diesel range organics, halogenated compounds, endocrine disrupting compounds, inorganic compounds, inorganic chemicals, and any combination thereof.

4. A method of enhancing remediation of contaminated matrices according to claim 1 wherein said at least one microbial population is selected from a group consisting of indigenous microbial population, aerobic microorganisms, facultative microorganisms, obligate anaerobic microorganisms, and any combination thereof.

5. A method of enhancing remediation of contaminated matrices according to claim 1 wherein said bioelectrochemical electron transfer circuitry is selected from a group consisting of microbial fuel cells, biofuel cells, electrolysis cells, and microbial electrolysis cells.

6. A method of enhancing remediation of contaminated matrices according to claim 1 wherein said step of substantially ameliorating microbial biodegradation of said at least one contaminant in said water environment with said at least one stimulated microbial population comprises the step of increasing the rate of degradation of said at least one contaminant by between about 10% to about 10,000% when compared to a baseline degradation rate.

7. A method of enhancing remediation of contaminated matrices according to claim 1 wherein said step of utilizing no load or a limited load with said bioelectrochemical electron transfer circuitry comprises the step of utilizing said limited load to jump start said bioelectrochemical electron transfer circuitry.

8. A method of enhancing remediation of contaminated matrices according to claim 1 wherein said step of substantially ameliorating microbial biodegradation of said at least one contaminant in said water environment with said at least one stimulated microbial population comprises a step selected from a group consisting of:
    substantially ameliorating microbial biodegradation of said at least one contaminant near said at least one non-floating anode;
    substantially ameliorating microbial biodegradation of said at least one contaminant near said at least one three dimensional, floating cathode; and
    substantially ameliorating microbial biodegradation of said at least one contaminant near said at least one three dimensional, floating cathode and said at least one non-floating anode.

9. A method of enhancing remediation of contaminated matrices according to claim 1 and further comprising the step of using said bioelectrochemical electron transfer circuitry with an aeration system.

10. A method of enhancing remediation of contaminated matrices according to claim 1 wherein said water environment is selected from a group consisting of an in-situ environment and an ex-situ environment.

11. A method of enhancing remediation of contaminated matrices according to claim 1 and further comprising the step of placing at least two cathodes at a different water height in said environment.

12. A method of enhancing remediation of contaminated matrices according to claim 1 wherein said at least one three dimensional, floating cathode comprises a cathode attached to a material selected from a group consisting of a buoyant material, cork, expanded plastic, expanded plastic made from polystyrene, filled containers, water absorbent materials, sponge, and any combination thereof.

13. A method of enhancing remediation of contaminated matrices according to claim 1 and further comprising the step of balancing buoyancy with water absorption in said at least one three dimensional, floating cathode.

14. A method of enhancing remediation of contaminated matrices according to claim 1 wherein said bioelectrochemical electron transfer circuitry comprises a tubing electrode.

15. A method of enhancing remediation of contaminated matrices according to claim 1 and further comprising the step of increasing conductivity within said water environment.

16. A method of enhancing remediation of contaminated matrices according to claim 15 wherein said step of increasing conductivity within said water environment comprises the step of adding a conductive material to said environment, said conductive material is selected from a group consisting of sodium chloride, potassium chloride, magnesium chloride, sodium carbonate, sodium bicarbonate, calcium carbonate, calcium bicarbonate, and any combination thereof.

17. A method of enhancing remediation of contaminated matrices according to claim 1 wherein said three dimensional, floating cathode comprises a shape selected from a group consisting of a cylinder, cube, and sphere.

18. A method of enhancing remediation of contaminated matrices according to claim 1 and further comprising a step selected from a group consisting of:
    providing a stick-up well box in said bioelectrochemical electron transfer circuitry; and
    providing a low flow soil vapor extraction system in said bioelectrochemical electron transfer circuitry.

19. A method of enhancing remediation of contaminated matrices according to claim 7 and further comprising the steps of:
    removing said limited load from said bioelectrochemical electron transfer circuitry; and
    passively running said bioelectrochemical electron transfer circuitry.

* * * * *